(12) United States Patent
Morkel et al.

(10) Patent No.: US 11,256,669 B1
(45) Date of Patent: Feb. 22, 2022

(54) TRANSACTION PIPELINE MATERIALIZATION SCHEMAS

(71) Applicant: Amazon Technologies, Inc., Seattle, WA (US)

(72) Inventors: John Michael Morkel, Seattle, WA (US); Yevgeniy Mikhaylyuta, Sammamish, WA (US); Timothy Daniel Cole, Seattle, WA (US); Christopher Richard Jacques de Kadt, Seattle, WA (US); Allan Henry Vermeulen, Corvallis, OR (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 15/199,796

(22) Filed: Jun. 30, 2016

(51) Int. Cl.
*G06F 16/21* (2019.01)
*G06F 16/23* (2019.01)
*G06F 16/22* (2019.01)

(52) U.S. Cl.
CPC .......... *G06F 16/211* (2019.01); *G06F 16/214* (2019.01); *G06F 16/2228* (2019.01); *G06F 16/23* (2019.01)

(58) Field of Classification Search
CPC ......... G06F 17/30297; G06F 17/30598; G06F 16/27; G06F 16/00; G06F 16/23; G06F 16/211; G06F 16/213; G06F 16/214; G06F 16/2228
See application file for complete search history.

(56) References Cited

U.S. PATENT DOCUMENTS

| | | | | |
|---|---|---|---|---|
| 9,507,843 B1* | 11/2016 | Madhavarapu | ....... | G06F 3/0619 |
| 10,938,817 B2* | 3/2021 | Han | ........................ | H04L 63/10 |
| 10,990,571 B1* | 4/2021 | Zhang | .................... | G06F 16/221 |
| 2014/0304229 A1* | 10/2014 | Zhu | .......................... | G06F 16/27 |
| | | | | 707/634 |
| 2015/0227533 A1* | 8/2015 | Goldstein | ............. | G06F 40/166 |
| | | | | 707/661 |
| 2016/0246821 A1* | 8/2016 | Meder | .................... | G06F 16/214 |
| 2017/0103226 A1* | 4/2017 | Eberlein | ............. | G06F 21/6227 |

* cited by examiner

*Primary Examiner* — Marcin R Filipczyk
(74) *Attorney, Agent, or Firm* — Davis Wright Tremaine LLP

(57) ABSTRACT

A journaled database system may comprise data nodes that maintain a collection of data and provide read access to the data to a client in accordance with a read schema and write access to the client in accordance with a write schema. A change to the schemas may be proposed. A materialization schema may be identified based on correlated determinations that both of the read schema and the write schema are satisfiable based on the materialization schema. The proposed changes may be accepted when the read schema and write schema are simultaneously satisfiable.

20 Claims, 7 Drawing Sheets

TRANSACTION PIPELINE MATERIALIZATION SCHEMAS

BACKGROUND

Recently, distributed computing environments have been employed to maintain collections of data. Multiple computing nodes, potentially distributed across various geographic regions and data centers, may be employed to collectively provide applications with an efficient mechanism for storing and retrieving data.

Access to the data maintained in a distributed system may be described and regulated through schemas. A schema may describe the structure of data stored in the distributed system, including various elements that may pertain to a collection of data, such as tables, views, columns, data types, constraints, and so forth.

In a distributed system, an issue that may arise pertains to changes to the schema. Changing the schema used by the system may involve applying changes to a number of computing nodes. Moreover, client applications may also need to adapt to changes to the schema they employ to access data maintained by the distributed system.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
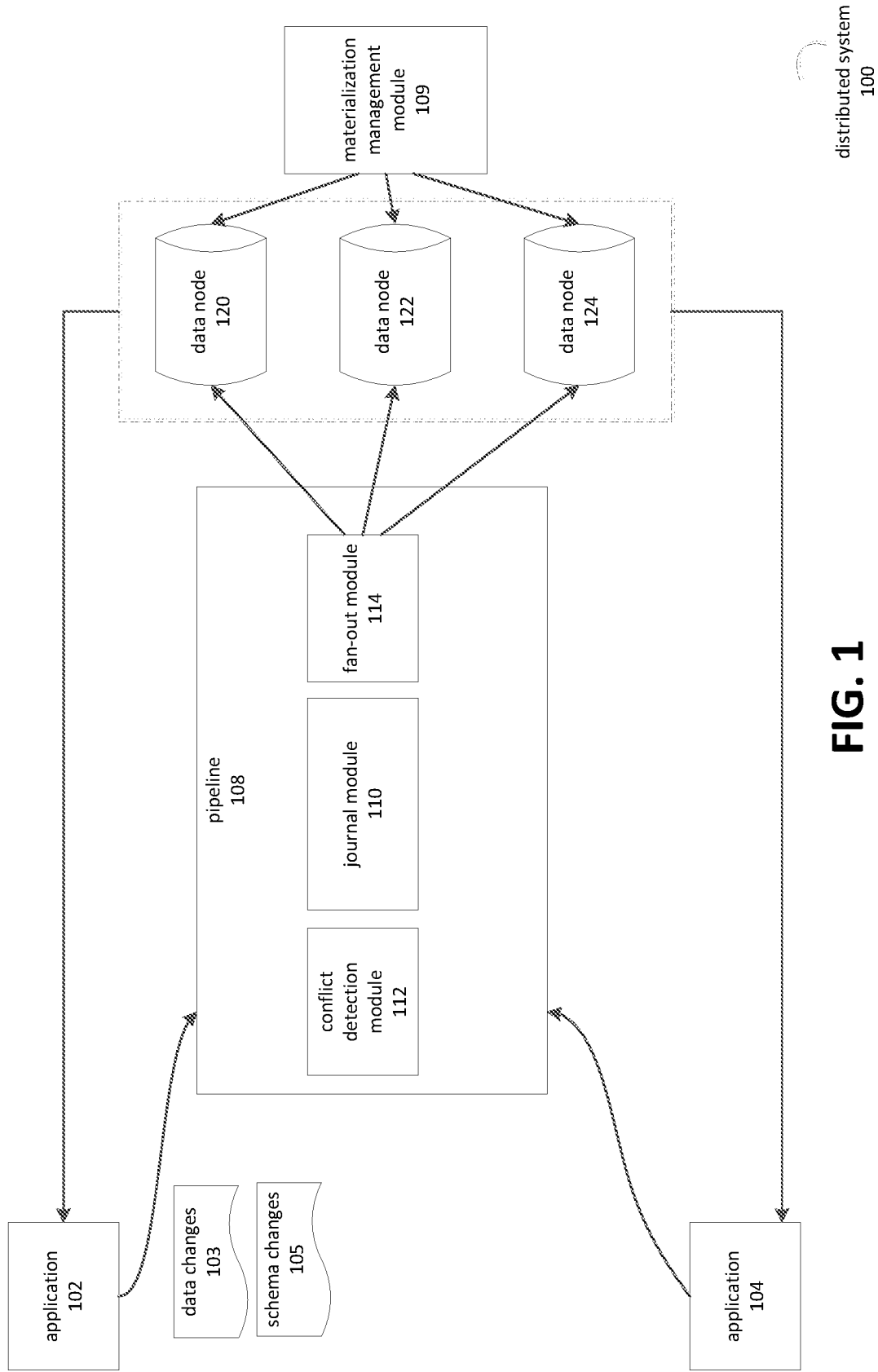
FIG. 1 is a block diagram depicting a distributed system with journaled updates.

Disclosed herein are systems, methods, and computer program products pertaining to distributed databases. Example embodiments may comprise a journaling component in which requests to modify the state of a collection of data are processed by a pipeline component subsystem. The pipeline component may analyze the requests for conflicts and then, in the absence of a conflict, durably store the instructions for later application to one of a number of storage nodes.

Changes to the schema of the collection may also utilize the pipeline in a process comprising at least two stages. During an initial phase, the changes to the schema may be analyzed. There may also be a stage, possibly coinciding with the initial stage, in which changes to the schema are enforced although not yet applied.

Changes to the schema may include changes to the write-oriented schema, for example those that impact interaction with the system to perform write operations. Changes to the schema may also include changes to read-oriented system, such as those that apply to how client applications read data stored on the data nodes.

In an example, a computer-implemented method of operating a distributed database system may comprise operations including the receiving of information indicative of a current or pending change to a schema governing access to a collection of data. In particular, the change may pertain to one or both of a read schema governing read access to the collection and a write schema governing write access. The read and write schemas may not, in some cases, directly correspond in all respects to each other or to the schema of the collection itself. The collection may be maintained on a storage device according to a materialization schema, which may define the physical structures, i.e. the actual tables, views, indexes, and so forth, that have been physically instantiated in, for example, a short or long-term storage device.

The operations of the computer-implemented method may further comprise determining that a materialization schema is simultaneously satisfiable with respect to both the proposed read and write schemas.

The materialization schema may be determined to be satisfiable with respect to the write schema when the materialization schema defines a materializable element requiring one or more elements to materialize, and the write schema defines one or more inputs for materializing the elements. In other words, the write schema may indicate that the data node may expect to receive data comprising the inputs needed to materialize the element defined by the materialization schema. If so, the write schema may be deemed to satisfy the requirements of the materialization schema, and vice versa.

The materialization schema may be satisfiable with respect to the read schema when a query specified by the read schema may be executed using an element of the materialization schema. In other words, the materialization schema may define an element that may be materialized on a storage device and used to process a query. The element might, for example, be a table, index, or view.

When the materialization schema is satisfiable with respect to both the read schema and the write schema, the underlying changes to the read or write schemas may be accepted. The computer-implemented method may comprise a further operation to send information indicating that a suitable materialization view exists and that the proposed changes to the schemas may be accepted.

The materialization schema may be formed by a process of mapping between elements of the proposed read schema and write schema, and back-propagating constraints between the various elements. Various materialization elements and strategies may explored, for example by identifying materialized views that may be used to satisfy queries defined by the read schemas and determining that the views may be materialized using inputs defined by the write schema.

If a potential materialization schema is not simultaneously satisfiable with respect to both the read and write schemas, additional materialization schemas may be generated and formed. Forming the materialization schema may, accordingly, be treated as an iterative process although other non-iterative techniques may be employed.

A materialization schema may be instantiated, typically after it has been deemed satisfiable with respect to both the proposed read and write schemas. The materialization schema may be instantiated by materializing each of the elements defined by the schema, i.e. creating each table, index, and view defined by the schema.

FIG. 1 is a block diagram depicting a distributed system 100 with journaled updates. In the distributed system 100, applications 102, 104 access data stored on the data node 120-124. The applications 102, 104 issue requests to modify the data. The requests are validated and then stored using a journaling technique, in which changes to data are durably recorded in a "journal" prior to being subsequently stored in one or more data nodes 120-124.

The data nodes 120-124 may individually or collectively maintain one or more collections of data. The data may be structured in accordance with, or in compliance with, a schema. A schema may refer to aspects of how the data in the collections is structured, such as the tables, columns, data types, constraints and so forth used when storing the data. The schema may also defined modes of interaction with the database, such as what projections, views, and data types are available for use in queries issued by the applications 102, 104.

Applications 102, 104 may obtain data from the data nodes 120-124 in a manner consistent with, or compliant with, the schema. The applications 102, 104 may submit various commands to store or retrieve data using references to various elements defined by the schema. Requests to modify data may be handled through the pipeline 108, while requests to obtain data may be handled through the data nodes 120-124.

The pipeline 108 may be a component of the distributed system 100. The pipeline 108 may process requests to modify data and to store new data. The pipeline 108 may durably store information describing requests to modify data or store new data, without waiting for the corresponding changes to be fully applied to the corresponding data nodes 120-124. This may improve the efficiency of applications 102, 104 because the applications 102, 104 are not required to wait for a requested change to be fully propagated throughout the system 100.

A conflict detection module 112 may identify conflicts between a pending request to update the data state, other pending requests, and the current data state. One example of a conflict is a requested modification to a data item that is based on out of date information. For example, if an update to an item was intended to increment a counter by '10,' storing '15' as the counter value would be correct only if the current value of the counter, prior to the increment, was '5.' To perform the update, a thread in the system might first read the current value of the counter and then write a corresponding updated value. In this example, a conflict might be detected if the value of the counter was changed to '8' by some other thread, after the original thread had read the current value as '5.'

The journal module 110 may maintain a durable store of instructions to modify the data state. For example, the conflict detection module 112 might validate a request to modify the data state. If no conflict is detected and the request is deemed valid, the journal module 110 might then store corresponding instructions to modify the data state on a storage device. The instructions may be stored by the journal module 110 so as to make the record of the instructions durable, so that the changes will be applied eventually to the data nodes 120-124 even in the event of a power interruption or other system failure. The journal module 110 may typically store instructions to modify the data state along with sequencing information, such as a global timestamp or serial number.

A fan-out module 114 may apply requested changes to the collections of data maintained by the data nodes 120-124. In some instances, one or more of the data nodes 120-124 may maintain distinct collections of data. In other instances, one or more of the data nodes 120-124 maintain partitions of a larger collection. In other instances, one or more of the data nodes 120-124 may maintain replicas of other partitions or collections.

The applications 102, 104 may operate on snapshots of the current data state. Instructions to modify the data state may be continually processed by the pipeline 108, such that operations are performed on what might be described as eventually consistent replicas of the data state. For example, an application 102 may obtain a local replica 130 of a collection of data maintained by the data nodes 120-124. The collection of data may initially refer to the state of values maintained by the data nodes 120-124. Over time, as instructions to modify the state of the values are processed, the local replica 130 may become out of sync with the state as seen by other components, such as other applications 104 or the data nodes 120-124. The other applications 104 may maintain a local replica 132 corresponding to the same set of data, and its perspective or view of the data may also be out of sync with the first application 102 or the data nodes 120-124.

The applications 102, 104 may issue schema changes 105 in addition to data changes 103. A schema change 105 may include requests to add a new table, to add a new column to an existing table, to add or remove a constraint on a column value, and so on. The schema changes 105 may include changes to one or both of a write schema governing how data is written to the pipeline 108 and provided to consumers of the underlying journal, such as the fan-out module 114, and a read schema, governing how applications 102, 104 consume data, including what queries the applications 102, 104 may execute on the data nodes 120-124

Schema changes 105 may be processed in stages. A first stage may involve issuing a proposal to modify a schema and validating the proposed change. A second stage may involve partial or system-wide acceptance of the proposed change.

In the first stage, one of the applications 102, 104 may propose a modification to the schema. The pipeline 108 may analyze the proposed change and make it durable, without yet fully applying the proposed change to the data nodes 120-124. The pipeline 108 may enforce or apply at least some aspects of the proposed schema during this period. The pipeline 108 may cause the fan-out modules 114 and data nodes 120-124 to also analyze the proposed change. The data nodes 120-124 may each analyze and determine their respective abilities or capabilities for maintaining data in a manner consistent with the proposed schema, and for providing access to the data in a manner consistent with the proposed schema.

The applications 102, 104 may also analyze the proposed modification to the schema. It may be determined if the applications 102, 104 are capable of operating in accordance with the new version of the schema that may result from application of the proposed modification. In some cases, one or more of the applications 102, 104 may be compatible with, and thus capable of operating in a manner consistent with the proposed schema. In other instances, the applications may indeed require the proposed schema.

In the second stage, the schema change may be applied to one or more of the data nodes 120-124, such that the collections of data maintained by the nodes are compliant with the new version of the schema. The second stage may comprise creating or activating the various elements of the new version of the schema, particularly those elements of the schema that are new. In some cases, elements of the new schema may be created prior to this stage.

A materialization management module 109 may govern formation, evaluation, and application of materialization schemas. The materialization management module 109 may, for example, form prospective materialization schemas and evaluate the prospective materialization schemas for satisfiability with respect to proposed read and write schemas. The materialization management module 109 may also, having identified a suitable materialization schema, cause the materialization schema to be instantiated on one or more of the data nodes 120-124.

Figure 2:
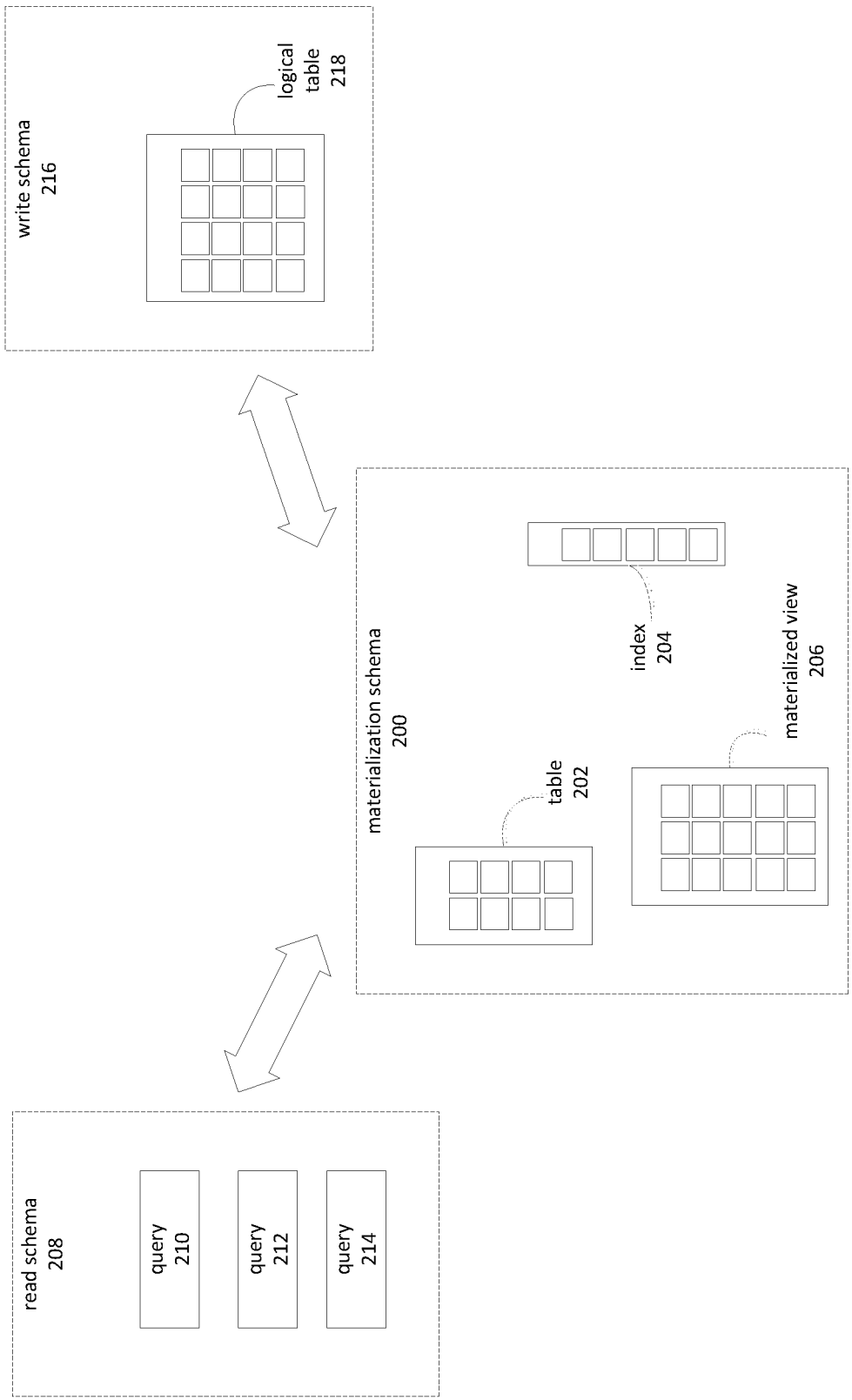
FIG. 2 is a block diagram depicting an example of a process for correlating read, write, and materialization schemas.

FIG. 2 is a block diagram depicting an example of a process for correlating read, write, and materialization schemas. A distributed system, such as the distributed system 100 depicted in FIG. 1, may rely on a "triangle" of schemas. The materialization schema 200 may define the underlying contents of a collection of data, as maintained by a data node on a storage device. For example, the materialization schema 200 may comprise definitions for a table 202, index 204, and materialized view 206. Each of these elements might be instantiated on a solid-state drive, random-access memory, or other storage device coupled to a data node to which the materialized schema 200 has been applied.

A write schema 216 may define the content and format of inputs to the system. For example, state change instructions submitted for recording in a journal, or supplied to a consumer of the journal, might be consistent with the elements defined by the write schema 216. This may be the case even if the write schema 216 does not directly correspond to the materialization schema 200. A write schema might, for example, contain a logical table 218 which has no direct equivalent in the materialization schema 200. However, write access to the corresponding collection of data might be defined in terms of the logical table, and not any of the elements 202-206 defined by the materialization schema.

The materialization schema 200 may be satisfiable with respect to the write schema 216 if the elements of the materialization schema 200 may be instantiated based on the inputs defined by the write schema 216. In the example of FIG. 2, this might be the case if the logical table 218 contained data necessary to instantiate the table 202, the index 204, and the materialized view 206.

The read schema 208 may define the means by which client applications may obtain read access to the collection of data. The read schema 208 may define queries 210-214. Each of the queries 210-214 might define a source element (such as a table) and a projection of the source element (such as the columns of the table).

The materialization schema 200 may be satisfiable with respect to the read schema 208 if the queries 210-214 defined by the read schema 200 can be executed using the elements defined by the materialization schema 200. Generally speaking, this may depend on whether the materialization schema 200 defines elements appropriate to execute the query. More particularly, satisfiability may be evaluated by obtaining a query plan for a query and determining if it may be satisfied using the query. As such, satisfiability may depend not only on superficial elements of the query, such as the table and columns it refers to, but also to other elements such as indexes needed to execute the query within reasonable performance parameters.

The materialization schema 200 may be formed and/or evaluated based on it being simultaneously satisfiable with respect to both the read schema 208 and the write schema 216. In some instances, there may be a number of possible solutions, i.e. potential materialization schemas that are satisfiable with respect to both the read and write schemas. Embodiments may, in some cases, select a set in which the materialization requirements of the materialization schema 200 is minimized. In some embodiments, potentially suitable materialization schemas may be scored based on criteria such as the materialization requirements, performance characteristics of queries in the read schema 208, and so forth.

Figure 3:
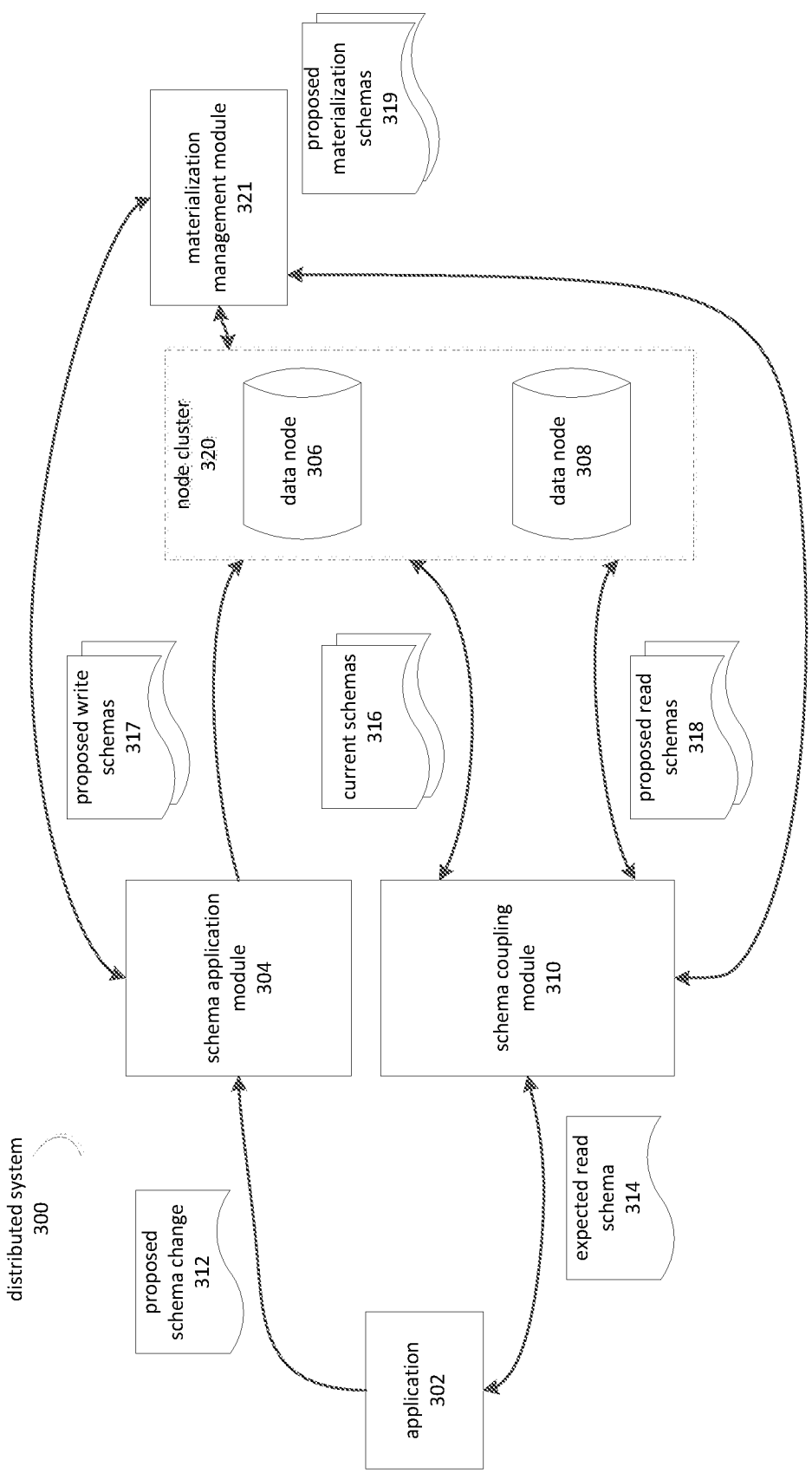
FIG. 3 is a block diagram depicting a schema acceptance process of a distributed system.

FIG. 3 is a block diagram depicting a schema acceptance process of a distributed system. A distributed system 300 may comprise a node cluster 320 from which an application 302 reads data. For illustrative purposes, it might also be assumed that the application 302 also, on occasion, issues data definition language ("DDL") statements or other commands that could result in a change to the schemas maintained by the data nodes 306, 308 that make up the node cluster 320. However, changes to the schemas might be initiated by a number of different sources, such as administrative clients, the operator of the node cluster 320, and so on.

A proposed schema change 312 may be received by a schema application module 304. The schema application module may, for example, be a component of the pipeline 108 that is depicted by FIG. 1. The schema application module 304 may perform operations pertaining to a first phase of the schema application. The first phase may include determining if the data nodes 306, 308 are capable of providing support for the proposed write schemas 317.

Read schemas associated with the proposed change may be evaluated by a schema coupling module 310. The proposed read schemas 318 may pertain to read-oriented interactions between the client application 302 and the data nodes 306, 308. The schema coupling module 310 may obtain information comprising definitions of schemas 316 currently supported by the data nodes 306, 308. The schema coupling module may also obtain information comprising definitions of proposed read schemas 318. As noted, read schemas pertain to read-oriented interactions between the client application 302 and the data nodes 306, 308. The proposed read schemas 318 may equate to those of the proposed write schemas 317. In some cases, the proposed read schemas 318 and the proposed write schemas 317 may be supersets or subsets of each other, or disjoint with respect to each other.

The schema coupling module 310 may also obtain information describing the schemas 314 expected by the application. The expected schemas 314 may be aspects of the application's 302 capabilities via-a-vie the proposed read schemas 318.

The schema coupling module 310 may, in some instances, apply a satisfiability modulo theory ("SMT") solver to identify which data nodes 306, 308 of the node cluster 320 may connected to the application 302 in order to match its expected read schema 314. Once a set of one or more data nodes 306, 308 has been identified, the schema coupling module 310 may send, to the device running the client application, instructions that may be used to connect to or otherwise obtain data from the corresponding data nodes.

The schema coupling module 310 may also coordinate creation of materialized views that are to be accessed by the client. The materialized views may be those specified in the read schema. A data node for building and/or storing the materialized view may, in some instances, be identified by the schema coupling module 310 using an SMT solver or other such approach.

A materialization management module 321 may also participate in the process by forming and evaluating proposed materialization schemas 319. The proposed materialization schemas 319 may be formed and evaluated using the satisfiability approaches described herein. In some instances, and SMT solver or other technique may be used. The materialization management module 321 may interact, for example, with the schema application module 304 and schema coupling module 310 to obtain proposed read and write schemas. Based on these, the materialization management module 321 may evaluate proposed materialization schemas 319 and, if a suitable schema is accepted, send information indicating that it approves of the proposed read schema 318 and proposed write schema 317. The materialization management module 321 may also, having accepted the proposed schemas 317, 318, cause the elements defined by the accepted version of the materialization schema to be instantiated on the data nodes 306, 308.

Figure 4:
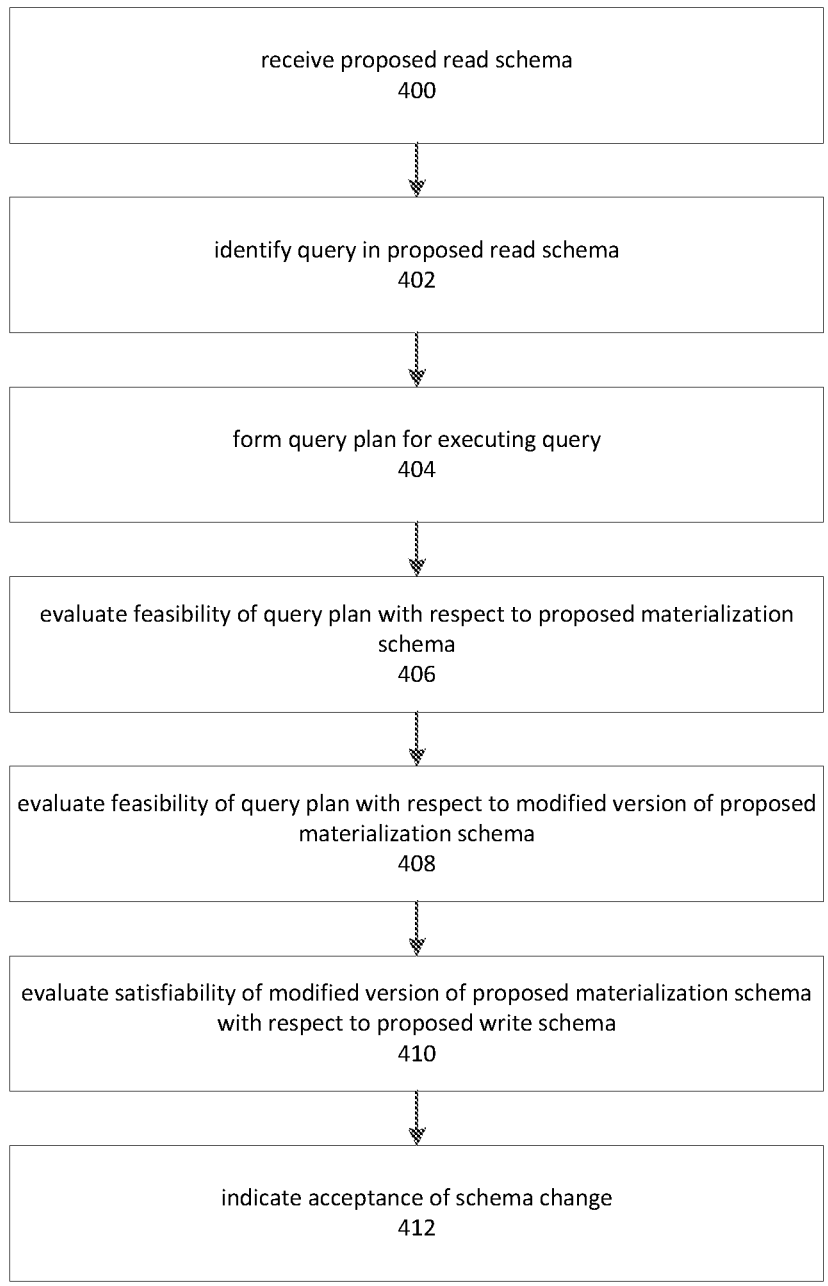
FIG. 4 is a flow diagram depicting an example of forming a materialization schema.

FIG. 4 is a flow diagram depicting an example of forming a materialization schema Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

At block 400, the schema coupling module may receive a message indicating that a schema change has been proposed. The message may originate from a component of the pipeline 108, such as the schema application module 304 depicted in FIG. 3. The message may, in some instances, be sent to the schema coupling module in response to determining that a proposed read schema or write schema has been tentatively accepted.

Block 402 depicts identifying a query defined in the proposed read schema. The system may then, as depicted by block 404, form a query plan that corresponds to the query. In some instances, a number of query plans may be generated for a given query and evaluated for satisfiability with respect to a materialization schema. Block 406 depicts evaluating the feasibility of a query plan with respect to the materialization schema. This may comprise factors such as whether or not the materialization schema defines tables, columns, or other elements potentially included in the materialization schema. It may also include other considerations, such as the availability of indexes relied on by a query plan. Embodiments may incorporate various tests for measuring or evaluating suitability, such as estimated performance of the query using a given materialization schema.

In some cases, the materialization schema may be modified, such that the new version of the materialization schema is more suitable to execute the query plan. For example, as depicted by block 408, a query plan referencing an index might first be evaluated with respect to a materialization schema that does not include the index, and then against a new version of the materialization schema that does include the index. Then, as depicted by block 410, the new version of the schema might be evaluated for satisfiability with respect to a proposed write schema. It might be the case, for example, that the proposed write schema does not supply sufficient inputs for materializing the index referred to by the query plan. On the other hand, it might be determined that the write schema does supply sufficient inputs, and that the new version of the materialization schema is therefore satisfiable with respect to both the read schema, since the materialization schema defines the index, and the write schema, since the materialization schema can be instantiated.

If the new version of the materialization schema simultaneously satisfies the proposed read and write schemas, acceptance of the proposed read and write schemas may be indicated by sending a message indicative of accepting the proposed schema change, as depicted by block 412.

Figure 5:
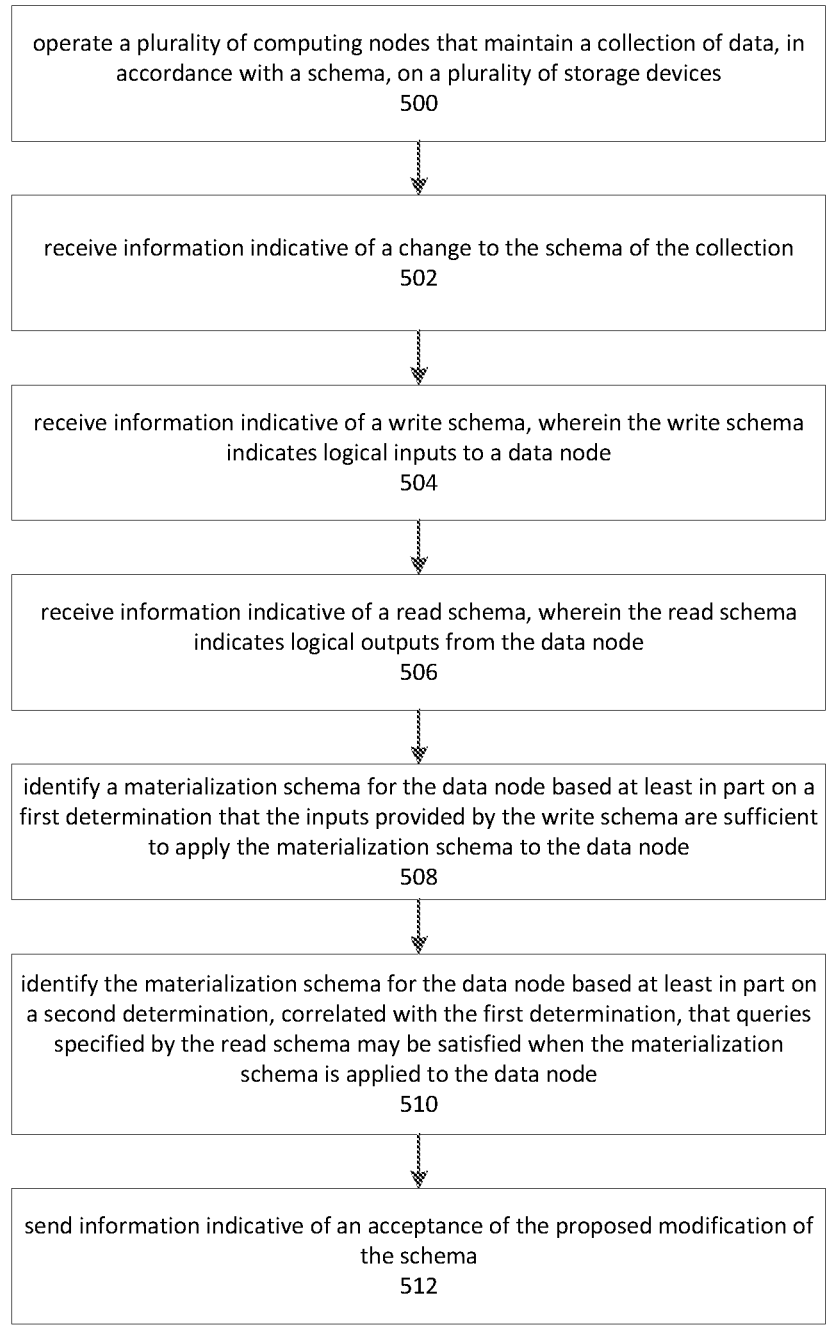
FIG. 5 is a flow diagram depicting formation of a materialization schema in a distributed system.

FIG. 5 is a flow diagram depicting formation of a materialization schema in a distributed system. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 500 depicts operating a plurality of computing nodes that maintain a collection of data. The plurality of computing nodes may maintain the collection on a plurality of storage devices. The collection may be subdivided, replicated, partitioned, and so forth on the storage devices. Typically, each of the computing nodes may maintain a subset of the data, or a replica of a subset. Access to the data may be in accordance with a schema. In particular, write access may be governed according to a write schema, and read access may be governed according to a read schema.

Block 502 depicts receiving instructions to modify one or both of a read schema or a write schema. The read schema, as noted, may indicate how data in the collection is read from the system. The write schema, meanwhile, may indicate how data is to be input into the system.

Block 504 depicts receiving information indicative of a write schema, wherein the write schema indicates logical inputs to a data node. The write schema may therefore describe the content and format of data that is to be supplied to a data node, and from which the data node may materialize the elements defined by a materialization schema.

Block 506 depicts receiving information indicative of a read schema, wherein the read schema indicates logical outputs from the data node. The logical output of a data node may be represented in the read schema as a query. For example, the read schema might specify a query which may be processed by the data node to produce a result set.

Block 508 depicts identifying a materialization schema for the data node based at least in part on a first determination that the inputs provided by the write schema are sufficient to apply the materialization schema to the data node. This may comprise evaluating the materialization schema for satisfiability with respect to the proposed write schema, as described herein.

Block 510 depicts identifying a materialization schema for the data node based at least in part on a second determination, correlated with the first determination, that queries specified by the read schema may be satisfied when the materialization schema is applied to the data node. This may comprise evaluating the materialization schema for satisfiability with respect to the proposed read schema. As noted, this second determination is correlated with the first determination regarding satisfiability of the write schema. Of course, the order of correlation is purely arbitrary, and indeed in some cases the satisfiability of the materialization schema with respect to the read and write schemas may be evaluated simultaneously.

Block 512 depicts that the system may send information indicating that the proposed modifications to the read and write schema may be accepted. coupling materialization management module may, for example, determine based on the analysis described herein that the read schema requirements are compatible with those that are or may be provided once the new write schema is accepted and at least partially put into place. A notification to accept the read and write schemas may then be sent, for example to the schema application module 304, to indicate that the proposed modification may be accepted.

Figure 6:
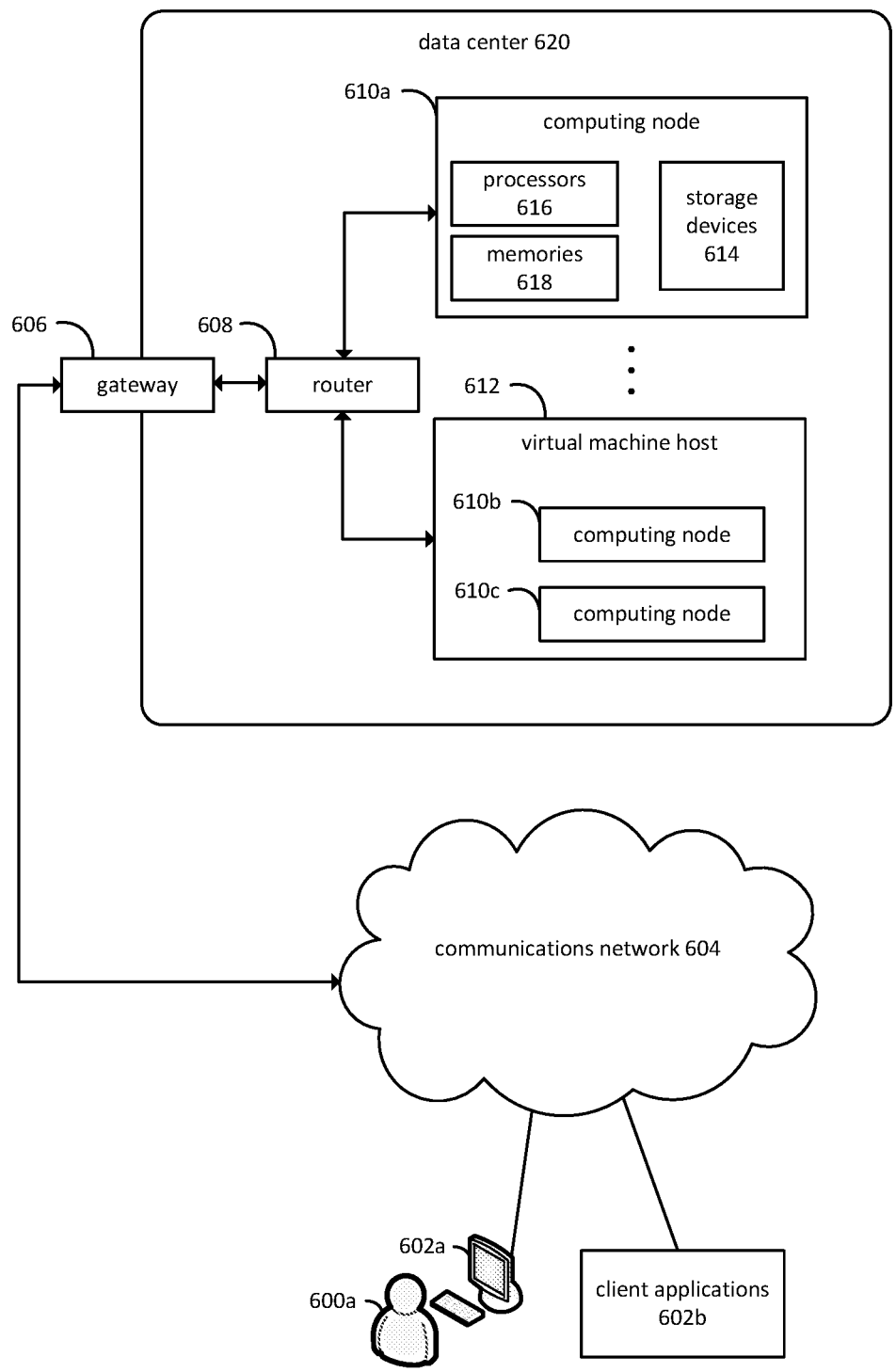
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618, and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
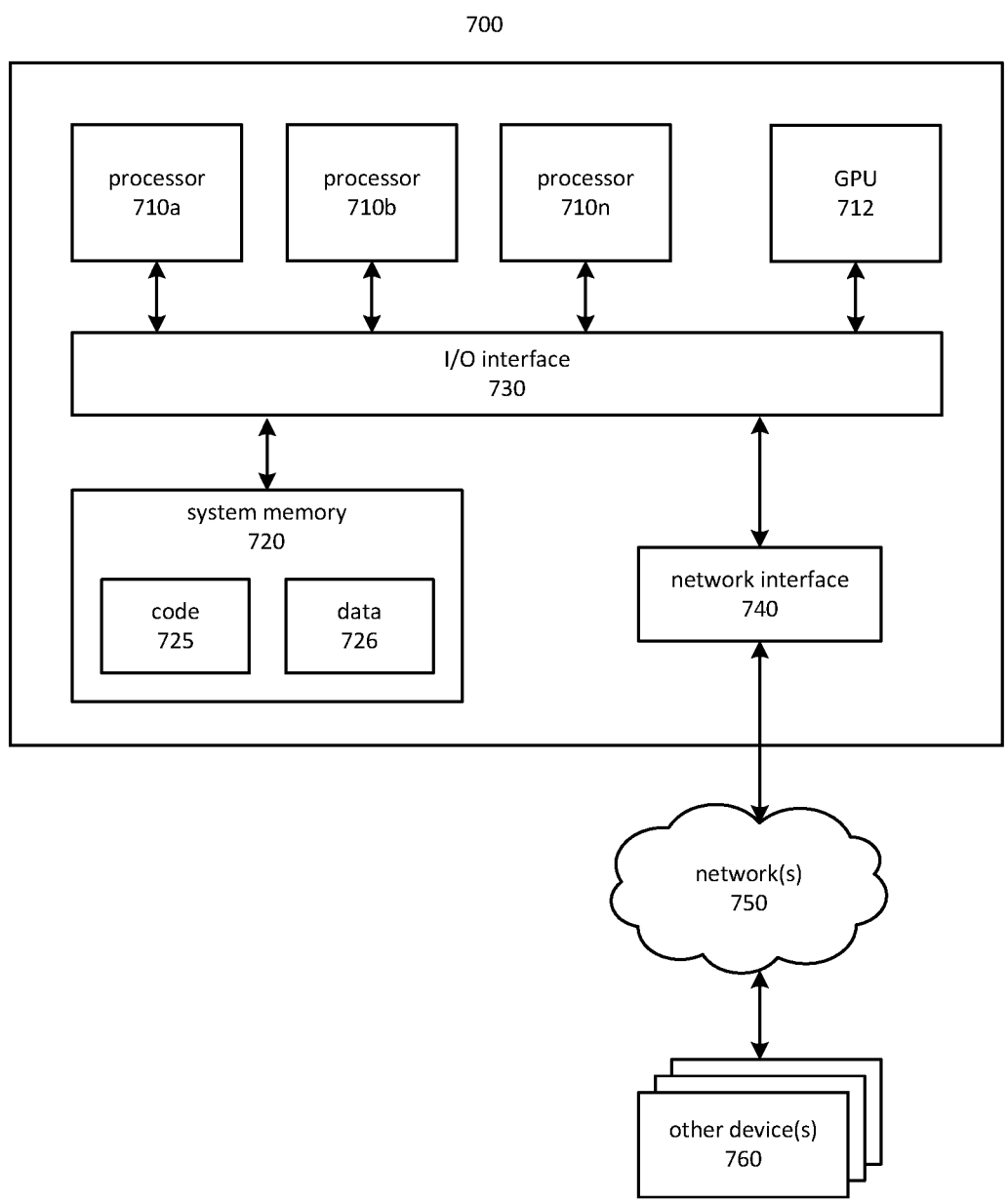
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 800 includes one or more processors 710a, 710b, and/or 710n (which may be referred herein singularly as a processor 710 or in the plural as the processors 710) coupled to a system memory 720 via an input/output ("I/O") interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720)

into a format suitable for use by another component (e.g., processor 710). In some embodiments, I/O interface 730 may include support for devices attached through various types of peripheral buses, such as a variant of the Peripheral Component Interconnect ("PCI") bus standard or the Universal Serial Bus ("USB") standard, for example. In some embodiments, the function of I/O interface 730 may be split into two or more separate components, such as a north bridge and a south bridge, for example. Also, in some embodiments some or all of the functionality of I/O interface 730, such as an interface to system memory 920, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   a first at least one computing device providing read access and write access to a collection of data stored on a storage device, wherein read access to the collection of data is governed by a read schema, and write access to the collection of data is governed by a write schema; and
   a second computing device that at least:
      receives information indicative of a proposed modification of the write schema and the read schema;
      determines that a first materialization schema that defines a physical structure of the collection of data is satisfiable with respect to the proposed modification of the write schema, wherein satisfiable with respect to the proposed modification of the write schema includes that the first materialization schema defines an element of the collection of data, and the proposed modification of the write schema defines one or more inputs for materializing the element, wherein materializing the element includes storing the element in accordance with the first materialization schema, wherein one or more of a table, index, or view of the collection of data is stored on the storage device with the physical structure defined by the first materialization schema;
      determines that the first materialization schema is also satisfiable with respect to the proposed modification of the read schema, wherein satisfiable with respect to the proposed modification of the read schema includes that the proposed modification of the read schema defines a query executable using the materialized element; and
      sends information indicative of acceptance of the proposed modification to at least one of the write schema or the read schema, based at least in part on determination that the first materialization schema is satisfiable with respect to the proposed modification.

2. The system of claim 1, wherein the second computing device at least:
   determines that a second materialization schema is not simultaneously satisfiable with respect to both the read schema and the write schema; and
   forms the first materialization schema in response to the determining that the second materialization schema is not simultaneously satisfiable.

3. The system of claim 1, wherein the second computing device at least:
   determines that the first materialization schema is satisfiable with respect to the proposed modification of the write schema based at least in part on determining that the element is materializable using the one or more inputs.

4. The system of claim 1, wherein the second computing device at least:
   forms the first materialization schema by at least mapping from a first element of the read schema to a second element of the write schema.

5. The system of claim 1, wherein the second computing device at least:
   determines that the first materialization schema is satisfiable with respect to the read schema based at least in part on determining that an index referenced by the query is materializable.

6. A computer-implemented method, comprising:
   receiving information indicative of a modification of a write schema governing write access to a collection of data maintained on a storage device and a modification of a read schema governing read access to the collection of data;
   determining that a first schema of the collection of data is satisfiable with respect to the modification of the write schema, wherein the first schema defines an element of the collection of data and the write schema defines one or more inputs for materializing the element on the storage device, wherein materializing the element on the storage device includes at least storing the element on the storage device in accordance with the first schema, wherein one or more of a table, index, or view of the collection of data is stored on the storage device with a physical structure defined by the first schema;
   determining that the first schema is satisfiable with respect to the modification of the read schema, wherein the read schema defines a query and wherein at least one query plan corresponding to the query is executable using the element; and
   sending information indicative of acceptance of the modifications to the write schema and the read schema, based at least in part on determination that the first schema is satisfiable with respect to the modification of the write schema and the modification of the read schema.

7. The computer-implemented method of claim 6, further comprising:
   determining that a second schema of the collection of data is not simultaneously satisfiable with respect to both the read schema and the write schema.

8. The computer-implemented method of claim 6, wherein the first schema is simultaneously satisfiable with respect to both the read schema and the write schema.

9. The computer-implemented method of claim 6, further comprising:
   determining that the first schema is satisfiable with respect to the write schema based at least in part on determining that the element is materializable using the one or more inputs.

10. The computer-implemented method of claim 6, further comprising:
    forming the first schema by at least mapping from a first element of the read schema to a second element of the write schema.

11. The computer-implemented method of claim 6, further comprising:
    forming the first schema by at least identifying one or more materialized views usable to execute the query.

12. The computer-implemented method of claim 6, further comprising:
    determining that the first schema is satisfiable with respect to the read schema based at least in part on determining that an index referenced by the query plan is materializable on the storage device.

13. The computer-implemented method of claim 6, further comprising:
    materializing each element of the first schema on the storage device.

14. A non-transitory computer-readable storage medium comprising executable instructions that, upon execution by a computing device, cause the computing device at least to:
    receive information indicative of a proposed modification of a write schema governing write access to a collection of data maintained on a storage device and a proposed modification of a read schema governing read access to the collection of data;

determine that a first schema of the collection of data is satisfiable with respect to the proposed modification of the write schema, wherein the first schema defines an element of the collection of data and the write schema defines one or more inputs for materializing the element, wherein materializing the element includes storing the element in accordance with the first schema, wherein the first schema defines a structure of at least one of a table, view, or index of the collection of data, the structure maintained on the storage device;

determine that the first schema is satisfiable with respect to the proposed modification of the read schema, wherein the read schema defines a query and wherein at least one query plan corresponding to the query is executable using the materialized element; and send information indicative of acceptance of the proposed modifications to the write schema and the read schema, based at least in part on determination that the first schema is satisfiable with respect to at least one of the proposed modification of the write schema and the proposed modification of the read schema.

15. The non-transitory computer-readable storage medium of claim 14, comprising further instructions that, upon execution by the computing device, cause the computing device at least to:

determine that a second schema of the collection of data is not simultaneously satisfiable with respect to both the read schema and the write schema.

16. The non-transitory computer-readable storage medium of claim 14, wherein the first schema is simultaneously satisfiable with respect to both the read schema and the write schema.

17. The non-transitory computer-readable storage medium of claim 14, comprising further instructions that, upon execution by the computing device, cause the computing device at least to:

determine that the first schema is satisfiable with respect to the write schema based at least in part on determining that the element is materializable using the one or more inputs.

18. The non-transitory computer-readable storage medium of claim 14, comprising further instructions that, upon execution by the computing device, cause the computing device at least to:

form the first schema by at least mapping from a first element of the read schema to a second element of the write schema.

19. The non-transitory computer-readable storage medium of claim 14, comprising further instructions that, upon execution by the computing device, cause the computing device at least to:

determine that the first schema is satisfiable with respect to the read schema based at least in part on determining that an index referenced by the query plan is materializable.

20. The non-transitory computer-readable storage medium of claim 14, comprising further instructions that, upon execution by the computing device, cause the computing device at least to:

form elements defined by the first schema on the storage device.

* * * * *